Figure 1:
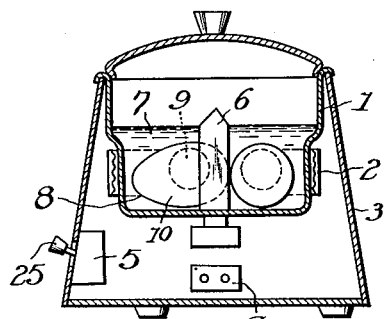

Inventors:
MOTOKI SHINOHARA and YOZO MIKATA

Attorneys

United States Patent Office 3,206,314
Patented Sept. 14, 1965

3,206,314
METHOD FOR BOILING EGGS
Motoki Shinohara, Kamakura-shi, Kanagawa-ken, and Yozo Mikata, Kamo-shi, Niigata-ken, Japan, assignors to Tokyo Shibaura Denki Kabushiki Kaisha, Kanagawa-ken, Japan, a joint-stock company of Japan
Filed May 15, 1962, Ser. No. 194,772
3 Claims. (Cl. 99—113)

This invention relates to methods for boiling eggs in their shells and more particularly to an improved method for preparing so-called "hot-spring eggs," that is, special soft-boiled eggs of the type wherein the egg white is still in liquid and fluid state while the yolk is soft-boiled.

Eggs are very important food because they contain large amounts of nutritive elements and can be stored over a relatively long period. However, raw eggs as well as completely boiled eggs are relatively difficult to digest, so that soft boiled eggs are preferred from the viewpoint of digestion. While there are various methods of preparing soft-boiled eggs, considerable skill and time are required to prepare the so-called "hot-spring eggs."

This difficulty is mainly caused by the difference in the coagulating or solidifying temperatures of the white and yolk of the egg. More particularly, usually the yolk begins to coagulate at a temperature in the range from 65° C. to 67° C., while the white begins to coagulate at from 75° C. to 80° C. Moreover, as the white has relatively low heat conductivity, in order to prepare soft-boiled eggs of the so-called hot-spring egg type, it has been customary to heat eggs for a long period of time at a low temperature of about 70° C., for example, a temperature which is insufficient to cause the white to coagulate. When cooking eggs at such a low temperature, about 30 minutes are required to prepare hot-spring eggs. If a higher temperature is utilized in order to reduce the cooking time, the white will nearly or completely coagulate even though the yolk is soft-boiled.

Accordingly, it is one object of this invention to provide a method of preparing soft-boiled eggs of the hot-spring egg type in a relative short time.

According to the method of this invention soft-boiled eggs wherein the white is still in the liquid or semi-liquid state and, hence, is flowable, but the yolk is soft-boiled, are obtained by utilizing the relative characteristics of the white and yolk whereby the yolk begins to coagulate at a lower temperature than the white, the specific gravity of the yolk is lower than that of the white, and the heat conductivity of the yolk is higher than that of the white.

According to one embodiment of this invention, eggs are placed in water contained in a pot which is gently heated by an electric heater. A thermostat is provided to deenergize the electric heater when the temperature of the water reaches a predetermined value. Thereafter, the eggs are cooked to soft-boiled condition by utilizing the heat retained by the water. The temperature of the upper portion or layers of the water in the pot is maintained higher than the remaining portion of the water, whereby the yolk which is floating in the upper portion of liquid-state white is heated from above. By this novel method of applying heat, it has been found that the so-called hot-spring eggs can be prepared in a relatively short time.

The egg cooker constructed in accordance with the principle of this invention comprises a pot, an electric heater associated with the said pot, a manually-reset type electromagnetic switch for controlling the circuit of the said electric heater, a thermostat responsive to the temperature of water in the said pot to control the energizing circuit of said electromagnetic switch, and a temperature indicating pilot lamp controlled by the said thermostat to be lighted when said electric heater is deenergized and to be extinguished when the temperature of the pot water decreases below a predetermined value. An additional indicating lamp may be provided in parallel with the electric heater to be lighted when the electric heater is energized.

Figure 2:
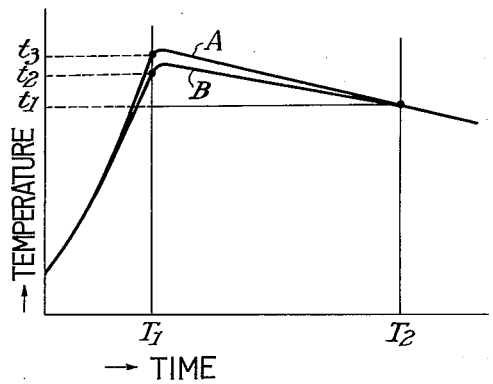
Figure 3:
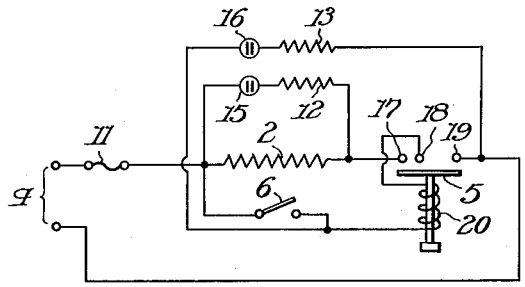
Figure 4:
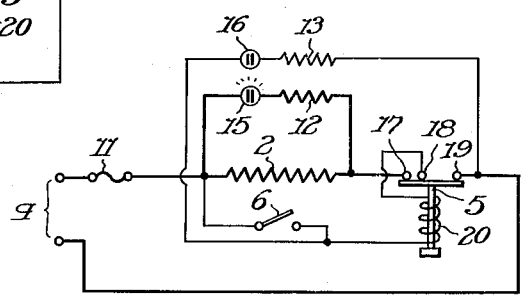
Figure 5:
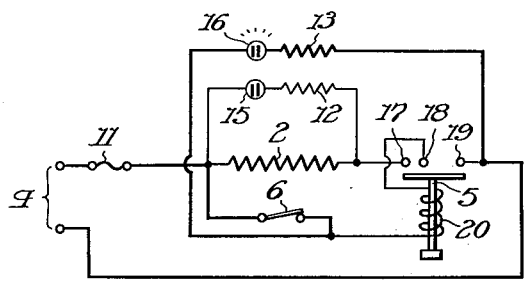

The features of the invention which are believed to be novel are set forth with particularity in the appended claims. The invention itself, however, as to its organization together with further objects and advantages thereof, may best be understood by reference to the following description taken in connection with the accompanying drawing, in which FIG. 1 shows a vertical section of an egg cooker embodying this invention;

FIG. 2 is a graphical representation indicating the relation between temperatures at upper and lower portions of the water in the pot and time; and FIGS. 3, 4 and 5 are circuit diagrams of the egg cooker embodying this invention, wherein FIG. 3 shows the condition before initiating cooking operation, FIG. 4 shows heating by an electric heater, and FIG. 5 shows the condition of heating by heat stored in the body of water in the pot.

Referring now to the accompanying drawing, FIG. 1 illustrates schematically a cross section of an egg cooker suitable for cooking eggs according to the method of this invention. The egg cooker has a pot 1 of suitable metal such as aluminium, the lower portion thereof being of reduced diameter. Around the side wall of this reduced diameter portion is provided a suitable electric heater 2 to heat a body of water 7, contained in the pot 1, from its outer side. The pot is surrounded by a housing 3 on which a socket-and-plug connector 4, adapted to be connected with a source of electric supply, and a manual reset type electromagnetic switch 5 are mounted. A suitable thermostat 6 is utilized to control the energization of said electromagnetic switch 5 in response to the temperature of the water 7.

Referring now to FIGS. 3, 4 and 5, the manual reset type electromagnetic switch 5 has three contacts 17, 18, and 19 and a coil 20 and is so designed that it will close contacts 17, 18 and 19 when manually actuated by a handle 25 and open these contacts upon energization of the coil 20. The coil 20 is connected to be controlled by said thermostat 6. An indicating or pilot lamp 15 is connected in parallel with the electric heater 2 via a current limiting resistor 12 so that the lamp 15 will be lighted when the electric heater 2 is energized. A second pilot lamp 16 for indicating the temperature of the egg cooker is connected across the connector 4 through the thermostat 6 and a current limiting resistor 13 so that it will be lighted when the heater 2 is deenergized and be extinguished when the temperature of the egg cooker decreases below a predetermined value. As is the practice well known in the art, a temperature-responsive fuse 11 is included in series with the electric heater 2.

The operation of the egg cooker of the above-described construction is as follows:

A suitable quantity of water 7 and one or several eggs 8 are placed in the pot 1. By the reason given hereinafter, it is advantageous to orientate the eggs horizontally as shown in FIG. 1. Then the handle 25 is manipulated to close the contacts 17, 18, and 19 of the electromagnetic switch 5 as shown in FIG. 4, thus initiating heating operation of the pot 1. At the same time, the pilot lamp 15 is lit to indicate that the electric heater 2 is being energized. Since the heater 2 is disposed to surround the lower side portion of the pot 1, the body of water 7 is heated by convection current of the water, and there is some difference in temperature between the upper portion or layers and lower portion or layers of the water. Thus the curve A of FIG. 2 represents the temperature of the water at the upper portion, while curve B represents that at the lower portion. When the temperature of the water at the upper portion reaches a predetermined value $t_3$, the thermostat 6 closes to momentarily energize the coil 20, causing the electromagnetic switch 5 to open and deenergize the electric heater as shown in FIG. 5. At this instant, the temperature of the water at the lower portion has a value of $t_2$ which is lower than $t_3$ by a predetermined value. The interval of time required for the water to reach these temperatures is indicated by $T_1$.

Subsequent to the time $T_1$ the heated water is gradually cooled, partly by giving some of its retained heat to the eggs 8, until a predetermined lower temperature $t_1$ is reached at the time $T_2$, at which time the thermostat 6 is restored to its original state as shown in FIG. 3 to deenergize the pilot lamp 16. Thus the heat quantity available for coagulation of the yolk is the integral of the heat between $T_1$ and $T_2$.

As pointed out above, since the specific gravity of the yolk is less than that of the white, as schematically shown in FIG. 1, the yolk 9 floats in the upper portion of the white 10 in the egg shell when the egg is placed horizontally. Thus, the yolk is heated more from above, through the shell and a thin layer of the white 10, by the upper portion of the water which is at a higher temperature than the lower portion. Accordingly, the yolk coagulates first while the white is still in liquid state.

From the above description it will be noted that in accordance with this invention, so-called hot-spring eggs, that is soft-boiled eggs in which the yolk is soft-boiled and the white is not or very slightly coagulated can be prepared by placing eggs in the pot together with a suitable quantity of water and then by closing the electromagnetic switch 5. By the time $T_2$, soft-boiled eggs of the required state are cooked, and thereafter, the cooked eggs may be taken out of the pot at any desired time because the temperature $t_3$ is selected to be lower than the temperature at which neither the yolk nor the white coagulates, and the degree of coagulation of the soft-boiled yolk will not increase after the time $T_2$.

As an illustration, an example of this invention is given below.

500 cubic centimeters of water at 17° C. and three eggs were placed in a pot 1 heated by a 500-watt, band-type electric heater 2. The room temperature was 20° C. When the temperature $t_3$ of the upper portion of the water reached 81° C., the thermostat 5 operated to deenergize the electric heater 2. At this time the temperature $t_2$ of the lower portion of the water reached 78° C., and the time required for this state to be reached was 6 minutes. Thereafter, the eggs were cooked by the heat stored in the body of water until the time $T_2$ at which the temperature of the water, at both the upper and lower portions, decreased to 65° C., which corresponds to the temperature $t_1$ at which the yolk begins to coagulate. The interval between $T_1$ and $T_2$ was 14 minutes. The yolk and the white do not coagulate at any temperature below 65° C., so that the soft-boiled eggs can be removed at any time after $T_2$ without increasing the degree of coagulation of the yolk.

This invention is characterized by the fact that the water in the egg cooker is heated to a predetermined temperature by energizing the electric heater for a relatively short interval to cook or soft-boil eggs by the heat stored in the body of water, and that a predetermined temperature difference is created between the upper and lower portions of the water to heat the yolk from above. Thus, the water in the pot should not be boiled or stirred to create an isothermal state throughout the body of water.

In order to create a temperature difference between the upper and lower portions of the water, any suitable method of heating other than that shown and described may be utilized. For example, the electric heater may be formed as a disk and floated on the upper surface of the water. In such a modification, the yolk of the egg can be more directly heated from above, and the water in the lower portion is heated by heat conduction along the side wall of the pot. It is also possible to submerge such a disk-shaped heater at the bottom of the pot, in which case a disk or shallow cup of heat insulating material having an outer diameter somewhat smaller than the inside diameter of the pot should be placed between the eggs and the heater in order to cause heated water to rise along the inner surface of the pot without directly contacting the eggs.

Thus, according to this invention, soft-boiled eggs of the so-called hot-spring type can be cooked in a relatively short period without any special skill. Moreover, the egg cooker of this invention not only can cook eggs in the desired manner, but also is convenient in use because it provides indications of heating by electricity, cooking by stored heat and completion of cooking.

In accordance with the provisions of the patent statutes we have explained the principle and operation of our invention and have illustrated and described what we consider to represent the best embodiment thereof. However, we desire to have it understood that within the scope of the appended claims, the invention may be practiced otherwise than as specifically illustrated and described.

What we claim as new and desire to secure by Letters Patent of the United States is:

1. A method of preparing a shell-enclosed soft-boiled egg so that it has a soft-boiled egg yolk and a substantially fluid egg white comprising the steps of: placing an egg in a horizontal attitude in an open container of liquid to allow its egg yolk to rise in the fluid egg white to an uppermost position within the egg shell; applying heat differentially to the liquid through a first time interval sufficient to raise the temperature of the upper portion of the liquid, surrounding the risen egg yolk, to a first value less than the liquid boiling temperature but substantially in excess of the temperature at which the yolk begins to coagulate, while raising the temperature of the lower portion of the liquid, surrounding the major portion of the egg white, to a second value less than said first value and of the order of the temperature at which the egg white only begins to coagulate; discontinuing the application of heat as soon as the two liquid portions reach the aforesaid respective temperatures; allowing the two portions of the liquid to cool naturally through a second time interval sufficient to reduce their temperatures to a value which is at least just below the temperature at which neither the yolk nor the white will begin to coagulate, while the yolk coagulates to the soft-boiled condition due to the heat stored in the upper liquid portion, and with the egg white remaining substantially fluid.

2. The method according to claim 1, wherein the heat is applied directly to the upper liquid portion and by conduction through the container to the lower liquid portion.

3. A method of preparing a shell-enclosed soft-boiled egg so that it has a soft-boiled egg yolk and a substantially fluid egg white comprising the steps of: placing an egg in a horizontal attitude in an open container of liquid to allow its egg yolk to rise in the fluid egg white to an uppermost position within the egg shell; applying heat differentially to the liquid through a first time interval, of the order of six (6) minutes, sufficient to raise the temperature of the upper portion of the liquid, surrounding the risen egg yolk, to a first value substantially in excess of the temperature at which the yolk begins to coagulate and of the order of 81° C., while raising the temperature of the lower portion of the liquid, surrounding the major portion of the egg white, to a second value less than said first valve, of the order of the temperature at which the egg white only begins to coagulate and of the order of 78° C.; discontinuing the application of heat as soon as the two liquid portions reach the aforesaid respective temperatures; allowing the two portions of the liquid to cool naturally, through a second time interval, of the order of fourteen (14) minutes, sufficient for the temperature to attain a value which is at least just below the temperature at which neither the yolk nor the white will begin to coagulate and of the order of 65° C., while the yolk coagulates to the soft-boiled condition due to the heat stored in the upper liquid portion, and with the egg white remaining substantially fluid.

References Cited by the Examiner

UNITED STATES PATENTS

| | | | |
|---|---|---|---|
| 1,213,148 | 1/17 | Blake | 99—113 |
| 1,955,289 | 4/34 | Greenfield. | |
| 2,473,041 | 6/49 | Urbain et at. | |
| 2,545,308 | 3/51 | Ritchie | 99—440 |
| 2,559,444 | 7/51 | Locke | 99—327 |
| 2,561,137 | 7/51 | Ross | 99—161 |
| 2,565,311 | 8/51 | Koonz et al. | 99—161 |

A. LOUIS MONACELL, *Primary Examiner.*

HYMAN LORD, *Examiner.*